(12) United States Patent
Chen et al.

(10) Patent No.: US 8,851,735 B2
(45) Date of Patent: Oct. 7, 2014

(54) UNIFORM REFLECTIVE LIGHT-GUIDE APPARATUS, AND BACKLIGHT MODULE AND LCD DEVICE HAVING THE SAME

(75) Inventors: Jia-Jen Chen, Taoyuan County (TW); Yu-Chun Tao, Taoyuan County (TW); Yan Zuo Chen, Taoyuan County (TW); Hao-Xiang Lin, Taoyuan County (TW); Cheng-Yu Hsieh, Taoyuan County (TW)

(73) Assignee: Entire Technology Co. Ltd (TW)

( * ) Notice: Subject to any disclaimer, the term of this patent is extended or adjusted under 35 U.S.C. 154(b) by 494 days.

(21) Appl. No.: 13/136,006

(22) Filed: Jul. 20, 2011

(65) Prior Publication Data
US 2012/0019743 A1    Jan. 26, 2012

Related U.S. Application Data

(60) Provisional application No. 61/367,002, filed on Jul. 23, 2010.

(51) Int. Cl.
*F21V 7/04* (2006.01)
*F21V 8/00* (2006.01)

(52) U.S. Cl.
CPC ............ *G02B 6/0055* (2013.01); *G02B 6/0065* (2013.01); *G02B 6/0041* (2013.01); *G02B 6/0025* (2013.01)

USPC ........... 362/624; 362/606; 362/618; 362/623; 362/629

(58) Field of Classification Search
USPC .................. 362/606–607, 617–620, 623–627
See application file for complete search history.

(56) References Cited

U.S. PATENT DOCUMENTS

2006/0268571 A1* 11/2006 Harada et al. .................. 362/607
2010/0188868 A1*  7/2010 Chuang et al. ................ 362/619

* cited by examiner

*Primary Examiner* — Sean Gramling

(57) ABSTRACT

A uniform reflective light-guide apparatus can accompany an optional edge light source and includes a light-guiding layer, a reflective layer and a light-exiting surface. The light-guiding layer further has a lateral side to define a light-introducing surface for allowing entrance of lights from the edge light source. The reflective layer is to reflect incident lights back to the light-guiding layer. The light-exiting surface perpendicular to the light-introducing surface is to allow at least a portion of the lights in the light-guiding layer to leave the light-guide apparatus. The reflective layer and the light-guiding layer are manufactured integrally by a co-extrusion process so as to avoid possible existence of an air spacing between the reflective layer and the light-guiding layer.

8 Claims, 12 Drawing Sheets

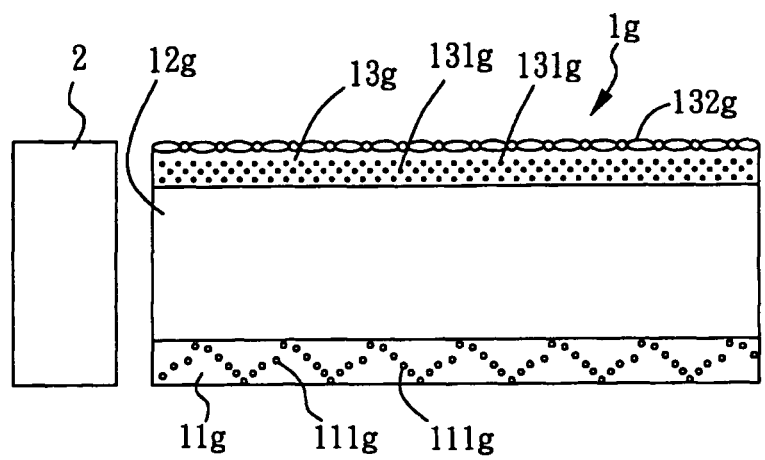
F I G. 12
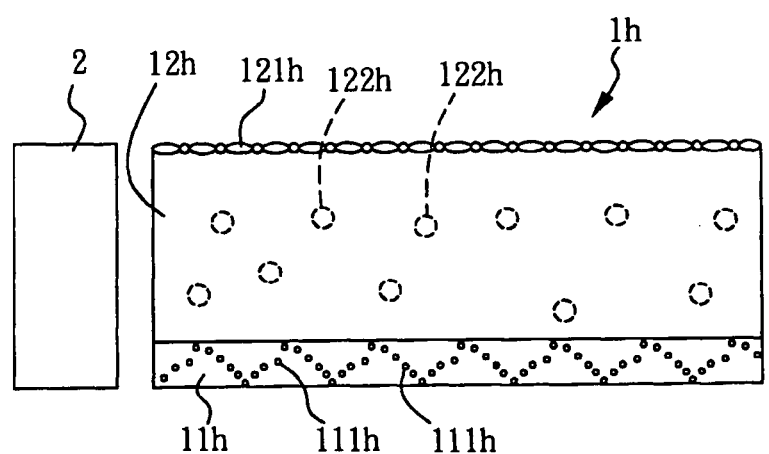
F I G. 13

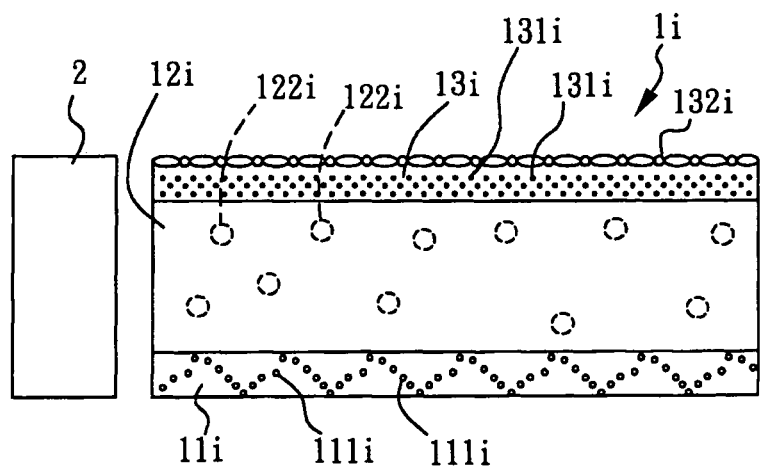
F I G. 14
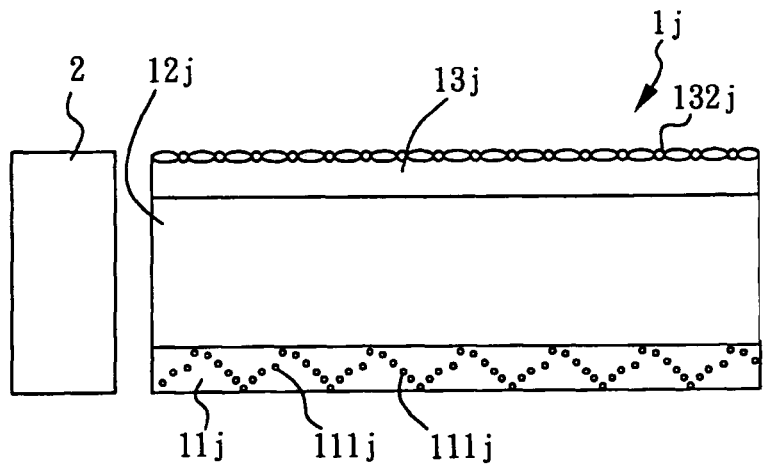
F I G. 15

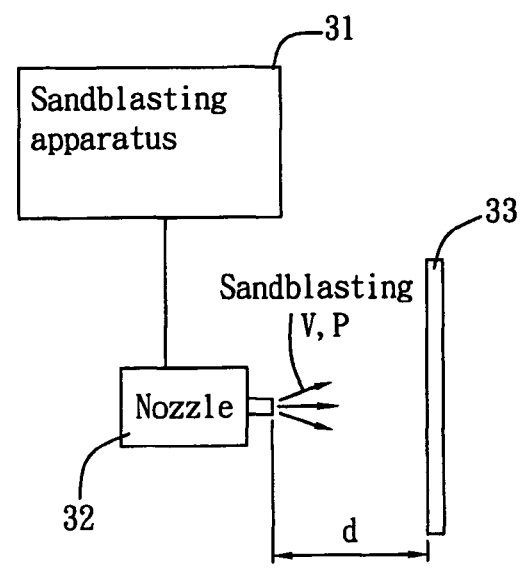
F I G. 18

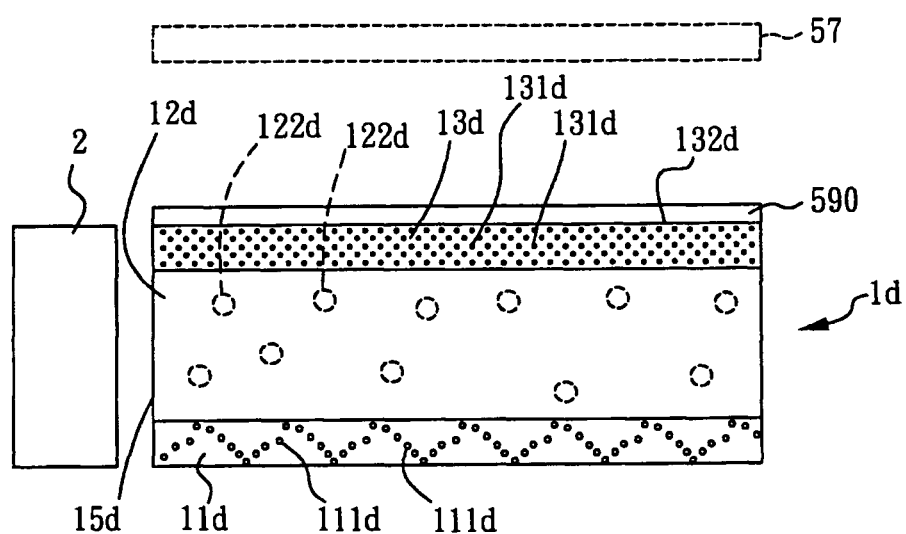
F I G. 20

UNIFORM REFLECTIVE LIGHT-GUIDE APPARATUS, AND BACKLIGHT MODULE AND LCD DEVICE HAVING THE SAME

BACKGROUND OF THE INVENTION (1) Field of the Invention

The invention relates to a light guide apparatus, and more particularly to the light-guide apparatus which is manufactured by a co-extrusion process and capable of light reflection, distribution and guiding. The light-guide apparatus can integrate an edge light source to perform as a backlight module for display devices.

(2) Description of the Prior Art

A light-guide plate is known to be a light-guide medium for a backlight module of display devices. The light-guide plate can be used as an edge-type module that guides lights emitted by an edge light source to leave vertically from a front surface of the display device so as to enhance the luminance and distribution of the display device.

Theoretically, the light-guide plate is to direct the incident lights to a particular side (usually the front surface) of the plate. The lateral side of the plate can diffuse to reflect the lights back into the plate and to leave from the front surface of the plate. A high refraction index of the plate usually implies a better light-guiding performance. Also, the bottom surface of the light-guide plate is usually formed as a reflection surface to send back lights into the plate and so as to have the light leave the plate at the targeted front surface.

Referred to FIG. 1, a conventional backlight assembly 5 disclosed in a U.S. Pat. No. 7,108,385, filed on Sep. 19, 2006 is shown to have an LCD panel 57, a diffusing membrane 56, a lens module 55, a light source module 50, and a light-guide module. The light-guide module further includes a front surface 523 for leaving the lights, a light-guide plate 520 and a reflection plate 524. The edge-type light source 50 energized and controlled by a circuit board 51 is attached to a lateral side 521 of the light-guide module.

In the art, the backlight assembly like the one shown in FIG. 1 usually has the following shortcomings in individual parts. These shortcomings in parts of the conventional backlight assembly are listed as follows in Table 1.

TABLE 1

Shortcomings in parts of a conventional backlight assembly

| Part | Function | Shortcomings |
|---|---|---|
| Reflection plate 524 | To reflect incident lights back into the light-guide plate | Increasing the light loss and thus reducing the light utilization efficiency by the spacing in between with the light-guide plate Increasing the cost of the backlight assembly |
| Light-guide plate 520 | To forward lights from the edge-type light source to the front surface | Ill-visibility caused by line defects from the necessary netting structure Needing the diffusing membrane to cure the line defects |
| Diffusing membrane 56 | To homogenize the lights in the light-guide plate, and to protect the lens module from possible scratches | Increasing the cost of the backlight assembly |
| Lens module 55 (BEF) | To coverage the lights, and to enhance the luminosity | Increasing the cost of the backlight assembly by difficulties in manufacturing |

TABLE 1-continued

Shortcomings in parts of a conventional backlight assembly

| Part | Function | Shortcomings |
|---|---|---|
| | | and design Vulnerable to break and scratch Causing redundant working cost in view of the working in the micro-structure of the light-guide plate |

Referred to FIG. 2, a lateral view of the light-guide plate 520 is shown to elucidate one of the aforesaid shortcomings in light loss of the light-guide plate 520 during a light transmission path. In order to increase the reflection efficiency of the backlight assembly 5, the additional reflection plate 524 is recommended to be included. Because a tiny air spacing 525 is always there between the reflection plate 524 and the light-guide plate 520, a loss in light 581 up to about 8% is inevitable. Such a light loss in between would decrease the light utilization efficiency but increase the manufacturing cost of the backlight assembly 5.

In addition, the light-guide plate in the art can be produced by applying an additional printing process, which involves steps of screen format preparing, inking and screen printing. All these complicated processes may contribute mainly to shortcomings in production yield and glazing bands. As shown in FIG. 3, glazing bands on a conventional light-guide plate 520 is schematically illustrated. These glazing bands may result in non-uniform brightness distribution to the light-guide plate 520; for example, to separate the screen into a bright area 582, a middle area 583 and a dark area 584.

As described above, the air spacing existing between the light-guide plate and the reflection plate can contribute to the increased light loss, the cost hike in producing the backlight assembly, the line defects, the manufacturing difficulty in the lens module and damages to the surface micro-structure. Hence, improvement upon overcoming the air spacing between plates shall be highly expected by the skill person in the art.

SUMMARY OF THE INVENTION

Accordingly, it is a primary object of the present invention to provide a uniform reflective light-guide apparatus, a backlight module and an LCD display having the same. By introducing the uniform reflective light-guide apparatus, the aforesaid shortcomings in light loss, production cost, line defects and necessitating of the lens module can be overcome.

To achieve the foregoing object, the uniform reflective light-guide apparatus in accordance with the present invention is introduced to accompany an edge light source to form a backlight module for an LCD display. The light-guide apparatus includes at least a light-guiding layer, a reflective layer and a light-exiting surface. The light-guiding layer further has a lateral side to be defined as a light-introducing surface to allow the entrance of lights from the edge light source. The reflective layer can reflect the incident lights back to the light-guiding layer. The light-exiting surface, perpendicular to the light-introducing surface, allows at least a portion of the lights in the light-guiding layer to leave the light-guide apparatus. In the present invention, the reflective layer and the light-guiding layer are manufactured integrally by a co-extrusion process so as to avoid possible existence of the aforesaid air spacing in between in the art.

In a preferred embodiment of the present invention, the light-guide coefficient (LGC) for the light-guide apparatus satisfies the following limitation: 2.07<LGC<4.23.

In another preferred embodiment of the present invention, the light-guide coefficient (LGC) for the light-guide apparatus further satisfies the following limitation: $0.001<(t2/t1)<0.111$, in which t1 is the thickness of the light-guiding layer and t2 is the thickness of the reflective layer.

In the present invention, the LGC can be computed as LGC=A/(B+C).

At an arbitrary point of the light-exiting surface, a normal line can be defined to be perpendicular to the light-exiting surface. The angle at this arbitrary point between the normal line and the incident ray is defined as the angle θ. In the case that the angle θ is greater than a critical angle θc, the incident ray can be 100% reflected back to the light-guiding layer. An angle-to-intensity plot for exiting light rays with respect to the uniform reflective light-guide apparatus in accordance with the present invention is drawn. The X axis of the plot is the angle axis ranged from 0 to 90 degrees, the Y axis of the plot is the axis for photo intensity, an L1 perpendicular to the X axis is the line defining the critical angle θc, and an L2 perpendicular to the X axis is the line defining an angle by adding 20 degrees to the critical angle θc. The A is the area defined by the light curve in the plot, the L2 and the X axis, the B is defined by the light curve, the L1, the L2 and the X axis, and the C is defined by the light curve, the L1 and the X axis.

In a preferred embodiment of the present invention, the uniform reflective light-guide apparatus further includes at least one of the following:

a plurality of diffusing particles, mixed in the light-guiding layer;

a light-distributing layer, located at a lateral side of the light-guiding layer by opposing to the reflective layer;

two plastics with different refractive indexes, mixed in the reflective layer;

a plurality of reflective particles, mixed in the reflective layer; and a coarse surface or a matted surface with a controllable transmittance, formed on the light-exiting surface.

In a preferred embodiment of the present invention, when the light-guiding layer includes the diffusing particles, difference in refraction index (Δn) between the diffusing particles and the plastics as the base matrix for the light-guiding layer is $0.04<\Delta n<0.1$, in which the size for the diffusing particles is ranged between 2 μm and 10 μm, and the refraction index for the plastics is ranged between 1.42 and 1.63.

When the light-guide apparatus of the present invention includes the light-distributing layer, the light-existing surface is located either on the light-distributing layer or on the light-guiding layer.

When the reflective layer is mixed with two plastics with different refraction indexes, the mixture ratio for these two plastics is about 7:3.

When the reflective layer is mixed with the reflective particles, the refraction index for the reflective particles is ranged from 2.2 to 3.2, the weight proportion for the reflective particles is less than 0.5%, the size for the reflective particles is ranged from 4-50 μm, the refraction index for the matrix plastics of the reflective layer is ranged from 1.6-2.5, and the difference in refraction index (Δn) between the reflective layer and the light-guiding layer is ranged between 0.05 and 1.

When the light-exiting surface includes the coarse surface, the roughness (Ra) for the light-exiting surface is 1 μm<Ra<6 μm.

In a preferred embodiment of the present invention, when the light-guide apparatus includes the light-distributing layer, the light-distributing layer further includes a plurality of diffusing particles. The difference in refraction index (Δn) between the diffusing particles and the matrix plastics for the light-distributing layer is ranged between 0.04 and 0.1, the size of the diffusing particle in the light-distributing layer is ranged between 2 μm and 10 μm, and the refractive index for the matrix plastics of the light-distributing layer is ranged between 1.42 and 1.63

In one preferred embodiment of the present invention, the critical angle can be computed as $\theta c=\sin^{-1}(1/n)$, in which n is the refractive index of the matrix plastics for the light-guiding layer, and the roughness (Ra) of the light-exiting surface is limited to 1 μm<Ra<2.21 μm if the light-exiting surface has the coarse surface.

BRIEF DESCRIPTION OF THE DRAWINGS

The present invention will now be specified with reference to its preferred embodiment illustrated in the drawings, in which:

FIG. 12 shows schematically an eighth embodiment of the uniform reflective light-guide apparatus in accordance with the present invention;

FIG. 13 shows schematically a ninth embodiment of the uniform reflective light-guide apparatus in accordance with the present invention;

FIG. 14 shows schematically a tenth embodiment of the uniform reflective light-guide apparatus in accordance with the present invention;

FIG. 15 shows schematically an eleventh embodiment of the uniform reflective light-guide apparatus in accordance with the present invention;

FIG. 18 shows a block diagram for a process to form a coarse surface on the light-exiting surface in accordance with the present invention;

FIG. 20 shows schematically an embodiment of an LED display having the uniform reflective light-guide apparatus in accordance with the present invention.

DESCRIPTION OF THE PREFERRED EMBODIMENT

The invention disclosed herein is directed to a uniform reflective light-guide apparatus, a backlight module having the same light-guide apparatus, and an LCD display having the same light-guide apparatus. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

To better and clearly describe the uniform reflective light-guide apparatus according to the present invention and the backlight module as well as the LCD display applying this light-guide apparatus, following descriptions will be detailed by accompanying figures.

Figure 4:
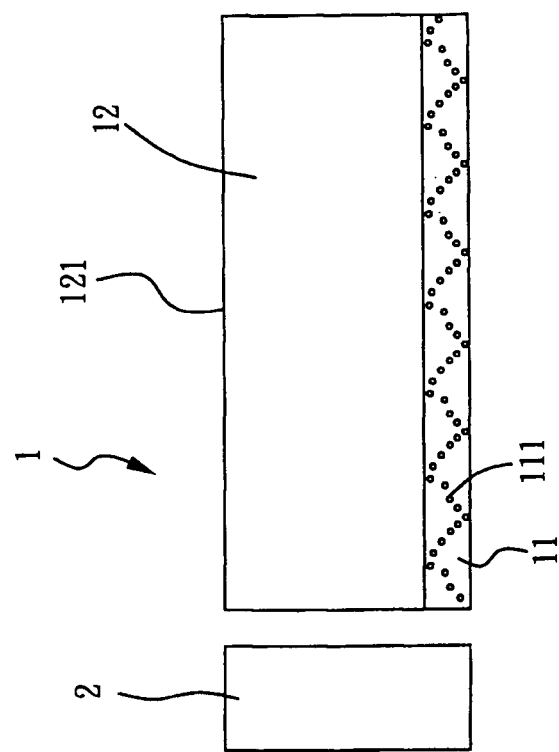
FIG. 4 shows schematically a first embodiment of the uniform reflective light-guide apparatus in accordance with the present invention.

(I) Briefing of the Present Invention on the Flat Plate of the Guide Light Apparatus:

As shown in FIG. 4, a first embodiment of the uniform reflective light-guide apparatus according to the present invention is schematically present. The uniform reflective light-guide apparatus 1, particularly an all-in-one light-guide apparatus, is to include internal diffusing particles and to apply an integral process to make the single apparatus to include functions of light-distributing, light-guiding and light-reflecting. Such an apparatus can be used with any edge-type light source. The main body of the light-guide apparatus mainly includes:

a reflective layer 11; and a light-guiding layer 12 capable of homogenizing or distributing uniformly the lights inside the layer 12.

As shown in FIG. 4, the main body of the light-guide apparatus 1 can be a simple one-piece double-layer plate which can be produced by a co-extrusion process.

(II) Briefing of the Present Invention on the Reflective Layer 11 (the Lower Layer):

In the present invention, one of many important design concepts of the uniform reflective light-guide apparatus 1 is to apply an edge light source 2 to replace the conventional net-type light source. Also, the reflective layer 11 is added to replace the conventional reflective plate. By applying the diffusing particles in the light-guiding layer 12, the line or point light source can be homogenized and transformed into a surface light source, such that the light-guide apparatus 1 can thus have multiple functions in light reflection, light-guiding and light distribution.

Figure 5:
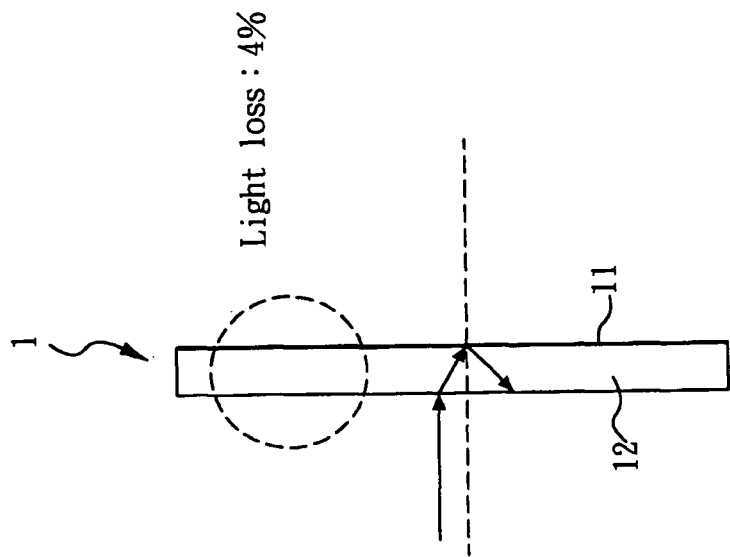
FIG. 5 shows how the apparatus of FIG. 4 can reduce the light loss.

By providing the aforesaid change, a substantial improvement in light loss can be gained by removing the reflective plate. Namely, in the present invention, the technique of including as the same plate a reflective layer 11 bottom to the light-guiding layer 12 capable of light distribution, as shown in FIG. 5, can wipe out the air spacing between the reflective layer 11 and the light-guiding layer 12, by compared to that shown in FIG. 2. Upon such an arrangement, the light utilization efficiency of the light-guide apparatus 1 of the present invention can be increased. Also, for the reflective layer 11 is capable of light reflection and light-guiding, the light loss thereof can be reduced to no more than 4%. Further, due to the manufacturing process for the light-guide apparatus 1 in accordance with the present invention is simplified, the membrane-adhering process, the process for producing the backlight module and the overall cost can be substantially reduced.

In the present invention, a preferred embodiment of the reflective layer 11 for the light-guide apparatus 1 can include the following features.

(1) The reflective layer 11 is produced by mixing two plastics with different refraction indexes, or by adding a predetermined amount of reflective particles into the matrix or plastics of the reflective layer 11.

(2) In the case that two plastics with different refraction indexes are used to form the base matrix of the reflective layer, the mixture rate can be a ratio of 7:3.

(3) In the case that the reflective particles 111 are introduced into the reflective layer 11, the refraction index for the reflective particle 111 can be ranged from 2.2~3.2, and the weight proportion of the reflective particles 111 can be less than 0.5%.

(4) The granular size of the reflective particles 111 can be ranged between 1-100 µm, preferable between 4-50 µm.

(5) The refraction index for the base matrix or plastics of the reflective layer 11 is ranged between 1.6-2.5.

(6) The difference in refraction index (Δn) between the reflective layer 11 and the light-guiding layer is ranged between 0.05-1.

(III) Briefing of the Present Invention on the Light-Guiding Layer 12 (the Upper Layer):

In the present invention, a preferred embodiment of the uniform reflective light-guide apparatus 1 can add a plurality of micro diffusing particles into the light-guiding layer 12 so as to transform the original line or point light source into a surface light source. Upon such an arrangement, the performance in the light distribution can be improved, and the light utilization efficiency can be increased by utilizing materials with different refraction indexes.

In the present invention, a preferred embodiment of the light-guiding layer 12 for the light-guide apparatus 1 can include the following features.

(1) The light-guiding layer 12 is added by a small amount of diffusing particles or is matt finished at the light-exiting surface 121.

(2) The difference in refraction index (Δn) between the diffusing particles and the light-guiding layer 12 is limited to $0.04 < \Delta n < 0.1$.

(3) The granular size of the diffusing particles is ranged between 2 µm~10 µm.

(4) The roughness (Ra) of the surface (the light-exiting surface 121) of the light-guiding layer 12 is defined as 1 µm<Ra<6 µm, so as to enhance the luminance and uniformity.

(5) The refraction index for the base matrix or plastics of the light-guiding layer is ranged between 1.42-1.63.

(IV) Briefing of the Present Invention on the Relationship Between the Light-Guiding Efficiency and the Thickness of the Light-Guiding Layer 12 (the Lower Layer):

In the present invention, a preferred thickness range of the reflective layer 11 can be obtained by evaluating the relation between the thickness of the reflective layer 11 and the amount of incident rays. Preferably, the thickness of the reflective layer 11 shall be less than 1/10 of the total thickness of the plate body (including the light-guiding layer 12 and the reflective layer 11.

(V) Briefing of the Present Invention on the Relationship Among Thickness, Concentration and Uniformity of the Light-Guiding Layer 12 (the Upper Layer):

In the present invention, relationship among thickness, concentration and uniformity for a preferred embodiment of the light-guiding layer 12 capable of light-distribution or homogenization may have the following features.

(1) The light-guiding layer 12 is added by a small amount of diffusing particles to resolve problems in line defects and ill-uniformity.

(2) The smaller the granular size of the diffusing particle is, the narrower the identical penetration distribution is.

(3) When the granular size of the diffusing particle becomes larger, the identical penetration distribution will become broader.

(4) The difference in refraction index, the granular size and the corresponding concentration of the diffusing particles in the light-guiding layer 12 are all control parameters to the aforesaid relationship.

In the present invention, problems of the light-guide apparatus 1 in line defects and ill uniformity can be resolved by introducing or doping a small amount of diffusing particles into the light-guiding layer 12. Also, thereby, the light utilization rate of the apparatus 1 can be enhanced. When the difference of the refraction rates between the diffusing particles and the plastic matrix of the light-guiding layer 12 is limited to $0.04<\Delta n<0.1$, a higher light penetration rate can be maintained.

In addition, the thickness of the light-guiding layer 12 and the concentration of the diffusing particles are highly related to the luminance and uniformity of the apparatus 1.

In the present invention, following structures of the apparatus 1 are related to performance of the light-guiding layer 12 in roughness and luminance.

(1) The roughness of the surface (light-exiting surface 121) of the light-guiding layer 12 is in favor to the luminance of the light-guiding layer 12.

(2) The distribution in roughness of the surface (light-exiting surface 121) of the light-guiding layer 12 is varied with the concentration of the diffusing particles.

In summary, the roughness (Ra) on the surface (light-exiting surface 121) of the light-guiding layer 12 has the following merits: (1) to increase the luminance of the light-guiding layer; (2) to resolve the line defects; (3) to enhance the uniformity.

In the present invention, a better luminance (L) can be obtained while the roughness (Ra) on the surface (light-exiting surface 121) of the light-guiding layer 12 is limited to the range of 1 μm to 6 μm.

Figure 6:
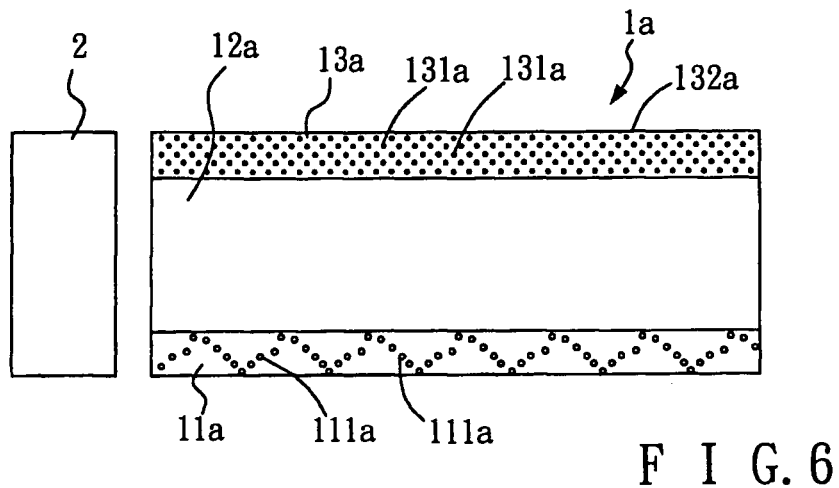
FIG. 6 shows schematically a third embodiment of the uniform reflective light-guide apparatus in accordance with the present invention.

(VI) Briefing of the Present Invention on the Three-Layer Laminating Structure of the Uniform Reflective Light-Guide Apparatus 1a:

Referring now to FIG. 6, the uniform reflective light-guide apparatus 1a is shown to have a three-layer laminating structure. The laminating structure is manufactured as a whole into a unique piece by a co-extrusion process. The main body of the uniform reflective light-guide apparatus 1a includes:

a reflective layer 11a (the lower layer);
a light-guiding layer 12a (the middle layer); and
a light-distributing layer 13a (the upper layer).

By applying the reflective particles 111a in the light-reflecting layer 11a, the line or point light source can be homogenized and transformed into a surface light source, by which the usage of the conventional net-type light source and the reflective plate can be replaced. Also, the light-guide apparatus 1a can have multiple functions in light reflection, light-guiding and light distribution.

Figure 1:
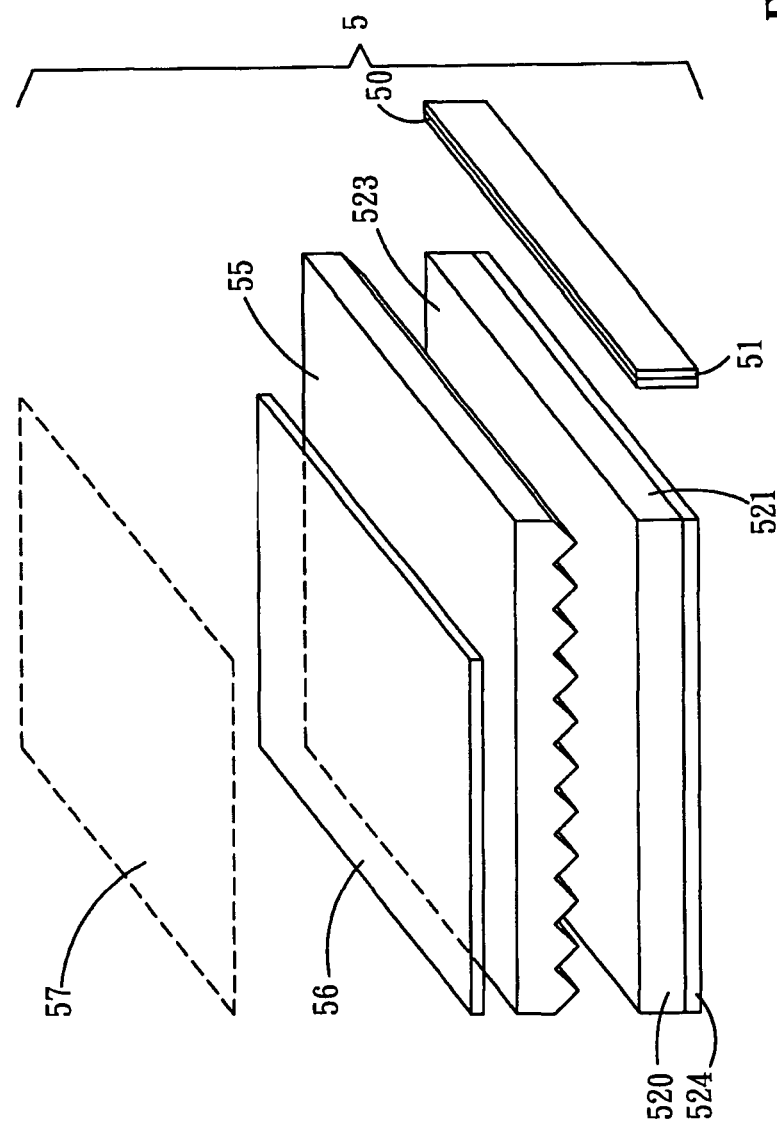
FIG. 1 is a schematic exploded view of a conventional backlight assembly.
Figure 3:
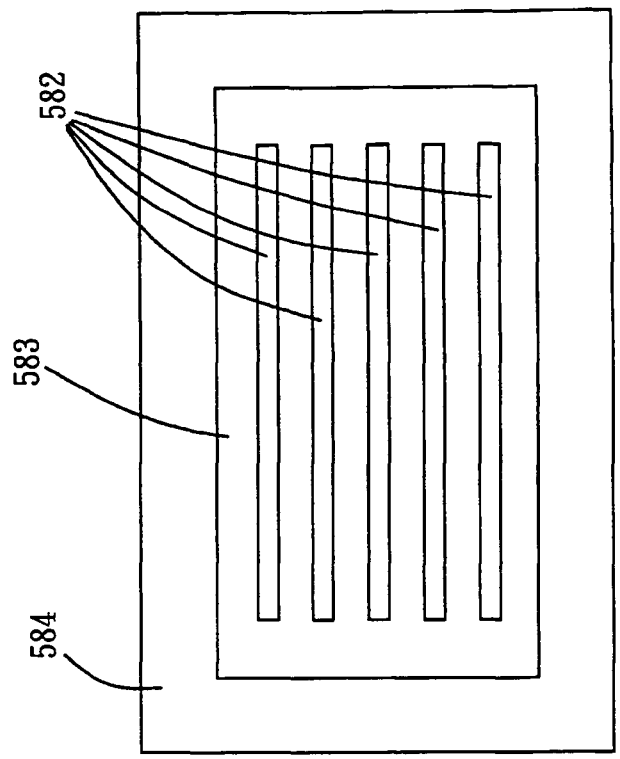
FIG. 3 shows possible line defects of FIG. 1.
Figure 2:
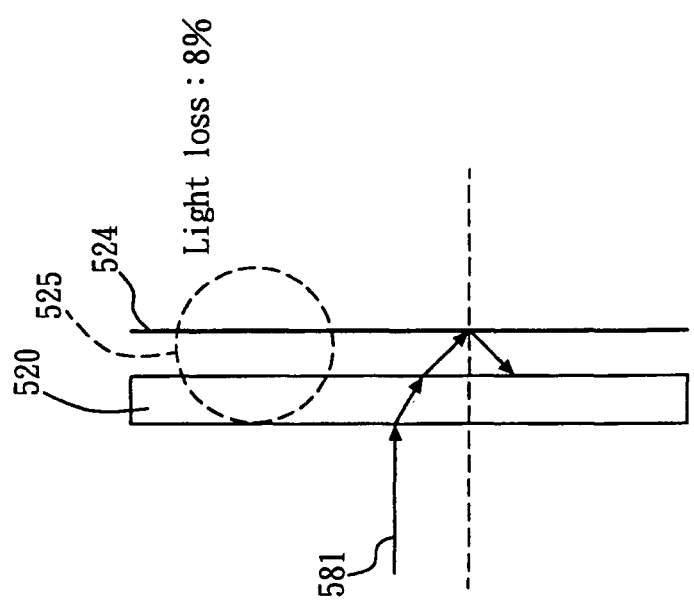
FIG. 2 is a lateral view of the light-guide plate and the diffusing plate of FIG. 1.

By providing the present invention, the aforesaid air spacing as shown in FIG. 2 in the prior design to cause majorly the light loss problem can be successfully removed. In the present invention, the reflective layer 11a is added, as the same plate from the same co-extrusion process, to the bottom of the light-guiding layer 12a, can totally avoid the existence of possible air spacing between the reflective layer 11a and the light-guiding layer 12a.

For no air spacing exists between the reflective layer 11a and the light-guiding layer 12a in accordance with the present invention, the light utilization efficiency of the light-guide apparatus 1a can be increased, and the light loss thereof can be reduced; by compared to the apparatus of FIG. 2. Further, due to the manufacturing process for the light-guide apparatus 1a in accordance with the present invention is simplified, the membrane-adhering process, the process for producing the backlight module and the overall cost can be substantially reduced.

Preferably, the reflective layer 11a of the light-guide apparatus 1a in accordance with the present invention is embodied as follows:

(1) Mixing two plastics with different refraction indexes, or adding a predetermined amount of reflective particles 11a;

(2) Keeping the mixture rate of these two plastics at 7:3;

(3) Having the refraction index for the reflective particle 111a can be ranged from 2.2~3.2, and the weight proportion of the reflective particles 111a less than 0.5%;

(4) Having the granular size of the reflective particles 111a ranged between 1-100 μm, preferable between 4-50 μm;

(5) Having the refraction index of the reflective layer 11a ranged between 1.6-2.5; and (6) Having the difference in refraction index ($\Delta n$) between the reflective layer 11a and the light-distributing layer 13a ranged between 0.05-1.

Upon such an arrangement, a better light reflection rate and a less light loss can be obtained.

In the present invention as shown in FIG. 6, the light-distributing layer 13a is located to a side (the top side in the figure) of the light-guiding layer 12a, by opposing to the location of the light-reflective layer 11a. The diffusing particles 13a in the light-distributing layer 13a can transform line or point light sources into a surface light source, such that the light distribution can be uniform. By providing different refraction indexes to the same plate body of the apparatus 1a, the light utilization efficiency can thus be substantially enhanced.

According to the preferred embodiment of the apparatus 1a, the light-distributing layer 13a can be embodied as follows:

(1) Adding a small amount of diffusing particles 131a, or processing matt treatment upon the light-exiting surface;

(2) Having a difference of the refraction indexes between the diffusing particles 131a and the matrix plastics of the light-distributing layer 13a limited by $0.04<\Delta n<0.1$;

(3) Having the granular size of the diffusing particles ranged between 2 μm~10 μm;

(4) Having the roughness (Ra) of the light-exiting surface 132a of the light-distributing layer 13a limited by 1 μm<Ra<6 μm, so as to increase the luminance and the uniformity; and (5) Having the refraction index of the matrix plastics for the light-distributing layer 13a ranged between 1.42-1.63.

In the apparatus 1a of the present invention, the relationship among thickness, concentration and uniformity of the light-distributing layer 13a can be embodied as follows:

(1) Adding a small amount of diffusing particles 131a to resolve problems in line defects and ill-uniformity;

(2) Making narrower the identical penetration distribution by making smaller the granular size of the diffusing particles;

(3) Making broader the identical penetration distribution by enlarging the granular size of the diffusing particles; and (4) Varying the performance by changing the difference in refraction index, the granular size and the corresponding concentration of the diffusing particles 131a.

In one embodiment of the light-guiding layer 12a (the middle layer) of the apparatus 1a in accordance with the present invention, a small amount of diffusing particles can be added to resolve the line defects and ill-uniformity of the light-guiding layer 12a. Also, thereby, the light utilization efficiency can be substantially increased. When $0.04<\Delta n<0.1$ between the diffusing particles and the matrix plastics of the light-guiding layer 12a, a better light penetration rate can be maintained.

In addition, the thickness ratio of the light-distributing layer 13a to the light-guiding layer 12a, the concentration of the diffusing particles 131a in the light-distributing layer 13a, the luminance and the light uniformity are correlated.

In the preferred embodiment of the apparatus 1a in accordance with the present invention, the shape of the light-guiding layer 12a and the roughness of the light-exiting surface 132a of the light-distributing layer 13a can be embodied as follows.

(1) When the surface of the light-distributing layer 13a is uneven, it is positive in enhancing the luminance of the light-guiding plate.

(2) Surface roughness of the light-exiting surface 132a of the light-distributing layer 13a varies with the concentration of the reflective particles 111a in the reflective layer 11a.

In the present invention, the merits of the surface roughness (Ra) of the light-exiting surface 132a of the light-distributing layer 13a are: (1) to increase the luminance of the light-guiding plate; (2) to resolve the problem of line defects; and (3) to enhance the uniformity.

Hence, in the present invention, the luminance (L) at the light-exiting surface 132a of the light-distributing layer 13a in the light-guide apparatus 1a can be better present at the condition of having a surface roughness (Ra) between 1 μm and 6 μm.

(VII) Briefing of the Present Invention on Various Embodiments of the Uniform Reflective Light-Guide Apparatus:

The first embodiment: as shown in FIG. 4, the main body of the uniform reflective light-guide apparatus 1 is manufactured as a unique piece to form a double-layer plate structure having a light-guiding layer 12 capable of light-distributing and a reflective layer 11. The top surface (the light-exiting surface 121) of the light-guiding layer 12 can be made as a matted surface with a controllable transmittance. The reflective layer 11 located under the light-guiding layer 12 can include reflective particles 111. The upper and the lower surfaces of the reflective layer 11 are both smooth surfaces.

Figure 7:
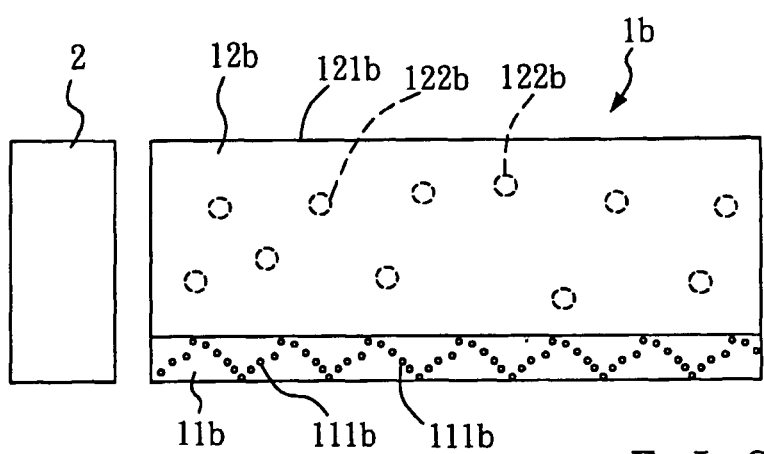
FIG. 7 shows schematically a second embodiment of the uniform reflective light-guide apparatus in accordance with the present invention.

The second embodiment: as shown in FIG. 7, the main body of the uniform reflective light-guide apparatus 1b is manufactured as a unique piece to form a double-layer plate structure having a light-guiding layer 12b capable of light-distributing and a reflective layer 11b. The light-guiding layer 12b as the upper layer can have diffusing particles 122b. The top surface (the light-exiting surface 121b) of the light-guiding layer 12b can be made as a matted surface with a controllable transmittance. The reflective layer 11b located under the light-guiding layer 12b can include reflective particles 111b. The upper and the lower surfaces of the reflective layer 11b are both smooth surfaces.

The third embodiment: as shown in FIG. 6, the main body of the uniform reflective light-guide apparatus 1a is manufactured as a unique piece to form a triple-layer plate structure having an upper light-distributing layer 13a further having diffusing particles 131a. The top surface (the light-exiting surface 132a) of the light-distributing layer 1a can be made as a matted surface with a controllable transmittance. The middle light-guiding layer 12a made of a transparent light-guiding material can have no diffusing particles. The lower reflective layer 11b can include reflective particles 111a. The upper and the lower surfaces of the reflective layer 11b are both smooth surfaces.

Figure 8:
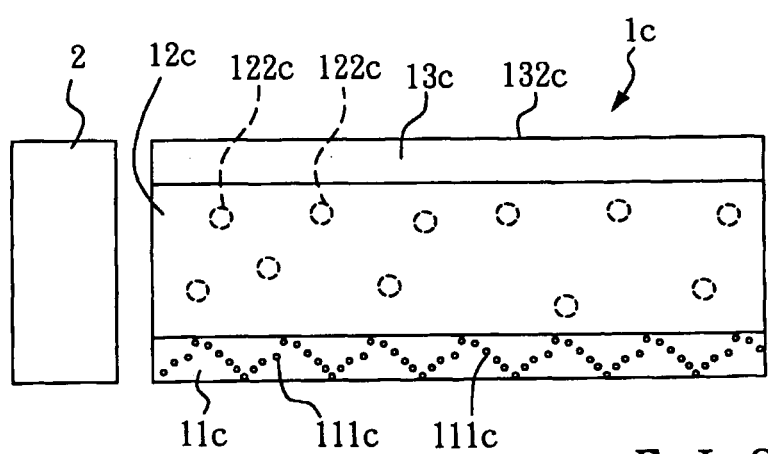
FIG. 8 shows schematically a fourth embodiment of the uniform reflective light-guide apparatus in accordance with the present invention.

The fourth embodiment: as shown in FIG. 8, the main body of the uniform reflective light-guide apparatus 1c is manufactured as a unique piece to form a triple-layer plate structure having an upper light-distributing layer 13c, a middle light-guiding layer 12c and a lower reflective layer 11c. The light-distributing layer 13c may have no diffusing particles, but has a top surface (the light-exiting surface 132c) formed as a matted surface with a controllable transmittance. The middle light-guiding layer 12c can have diffusing particles 122c. The lower reflective layer 11c can include reflective particles 111c. The upper and the lower surfaces of the reflective layer 11c are both smooth surfaces.

Figure 9:
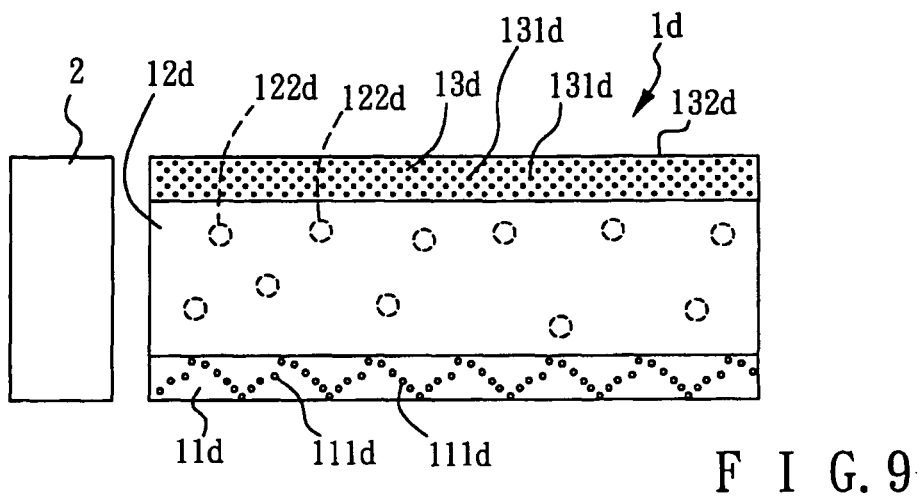
FIG. 9 shows schematically a fifth embodiment of the uniform reflective light-guide apparatus in accordance with the present invention.

The fifth embodiment: as shown in FIG. 9, the main body of the uniform reflective light-guide apparatus 1d is manufactured as a unique piece to form a triple-layer plate structure having an upper light-distributing layer 13d, a middle light-guiding layer 12d and a lower reflective layer 11d. The upper light-distributing layer 13d may have diffusing particles 131d, and has a top surface (the light-exiting surface 132d) formed as a matted surface with a controllable transmittance. The middle light-guiding layer 12d can have diffusing particles 122d. The lower reflective layer 11d can include reflective particles 111d. The upper and the lower surfaces of the reflective layer 11d are both smooth surfaces.

Figure 10:
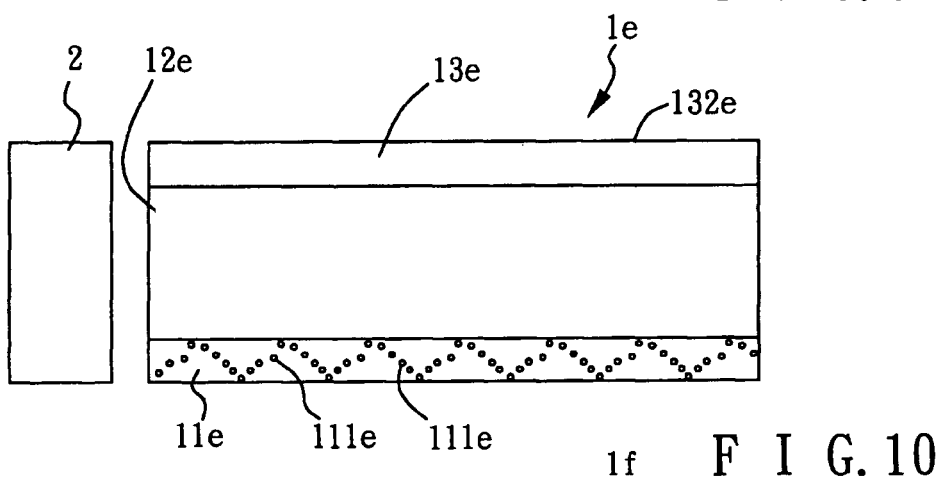
FIG. 10 shows schematically a sixth embodiment of the uniform reflective light-guide apparatus in accordance with the present invention.

The sixth embodiment: as shown in FIG. 10, the main body of the uniform reflective light-guide apparatus 1e is manufactured as a unique piece to form a triple-layer plate structure having an upper light-distributing layer 13e, a middle light-guiding layer 12e and a lower reflective layer 11e. The upper light-distributing layer 13e does not include any diffusing particle, but has a top surface (the light-exiting surface 132e) formed as a matted surface with a controllable transmittance. The middle light-guiding layer 12e does not include any diffusing particle, either. The lower reflective layer 11e can include reflective particles 111e. The upper and the lower surfaces of the reflective layer 11e are both smooth surfaces. In this embodiment, matrix of the light-distributing layer 13e and that of the light-guiding layer 12e do not have the same refraction index. It is noted that if the aforesaid two refraction indexes are the same in the sixth embodiment, the foregoing first embodiment in FIG. 4 is actually repeated.

Figure 11:
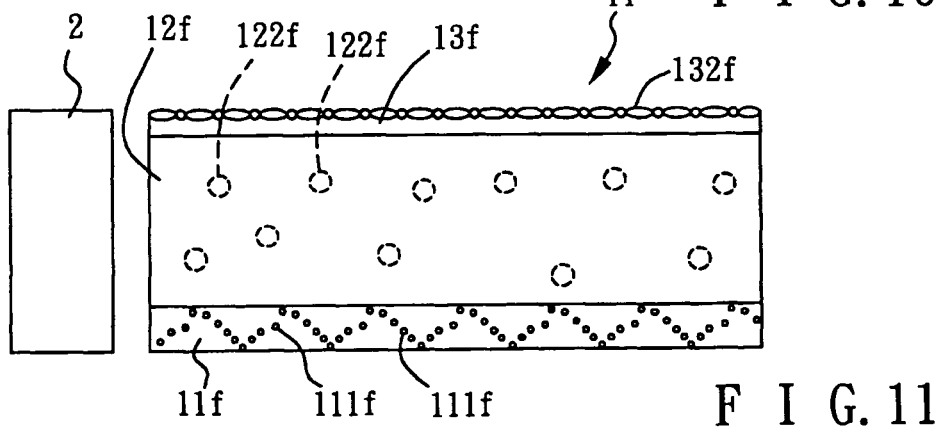
FIG. 11 shows schematically a seventh embodiment of the uniform reflective light-guide apparatus in accordance with the present invention.

The seventh embodiment: as shown in FIG. 11, the main body of the uniform reflective light-guide apparatus 1f is manufactured as a unique piece to form a triple-layer plate structure having an upper light-distributing layer 13f, a middle light-guiding layer 12f and a lower reflective layer 11f. The upper light-distributing layer 13f may have no diffusing particles, but has a top surface (the light-exiting surface 1320 formed as a rough surface. The middle light-guiding layer 12f can have diffusing particles 122f. The lower reflective layer 11f can include reflective particles 111f. The upper and the lower surfaces of the reflective layer 11f are both smooth surfaces. The upper surface (i.e. the light-exiting surface 132f) of the light-distributing layer 13f can be made as a coarse surface with controllable roughness for regulating the light uniformity of the apparatus 1f and also enhancing the apparatus luminance (so as to replace the conventional design in printed net nodes). Further, the coarse surface can lessen the adhering phenomenon between the apparatus 1f and the optical membrane (not shown in the figure) which is a conventional design to paste onto the light-distributing layer 13f. By compared to FIG. 2, there is no air spacing to exist between any two of the light-distributing layer 13f, the light-guiding layer 12f and the reflective layer 11f of the apparatus 1f of the present invention. Upon such an arrangement, the light-guide apparatus 1f capable of light reflection and distribution can enhance the light utilization efficiency, reduce effectively the light loss resulted from Fresnel Loss, and need no more the reflection plate. By applying the light-guide apparatus 1f to a backlight module, the corresponding structuring can be simplified and the related module costing can be substantially reduced.

The eighth embodiment: as shown in FIG. 12, the main body of the uniform reflective light-guide apparatus 1g is manufactured as a unique piece by a co-extrusion process to form a triple-layer plate structure having an upper light-distributing layer 13g, a middle light-guiding layer 12g and a lower reflective layer 11g. The upper light-distributing layer 13g includes diffusing particles 131g (to achieve functions in light homogeneity and defect waiving), and has a top surface (the light-exiting surface 132g) formed as a coarse surface with controllable roughness. The middle light-guiding layer 12g does not include any diffusing particle. The lower reflective layer 11g can include reflective particles 111g. The upper and the lower surfaces of the reflective layer 11g are both smooth surfaces.

The ninth embodiment: as shown in FIG. 13, the main body of the uniform reflective light-guide apparatus 1h is manufactured as a unique piece by a co-extrusion process to form a double-layer plate structure having a light-guiding layer 12h capable of light-distributing and a reflective layer 11h. The light-guiding layer 12h as the upper layer can have diffusing particles 122h, and the top surface (the light-exiting surface 121h) can be a coarse surface with controllable roughness. The reflective layer 11h located under the light-guiding layer 12h can include reflective particles 111h. The upper and the lower surfaces of the reflective layer 11h are both smooth surfaces.

The tenth embodiment: as shown in FIG. 14, the main body of the uniform reflective light-guide apparatus 1i is manufactured as a unique piece by a co-extrusion process to form a triple-layer plate structure having an upper light-distributing layer 13i, a middle light-guiding layer 12i and a lower reflective layer 11i. The upper light-distributing layer 13i may have diffusing particles 131i, and has a top surface (the light-exiting surface 132i) formed as a coarse surface with controllable roughness. The middle light-guiding layer 12i can have diffusing particles 122i. The lower reflective layer 11i can include reflective particles 111i. The upper and the lower surfaces of the reflective layer 11i are both smooth surfaces. In this embodiment, matrix of the light-distributing layer 13i and that of the light-guiding layer 12i do not have the same refraction index. It is noted that if the aforesaid two refraction indexes are the same and the diffusing particles 131i and 122i are also the same in this embodiment, the foregoing embodiment in FIG. 13 is substantially repeated.

The eleventh embodiment: as shown in FIG. 15, the main body of the uniform reflective light-guide apparatus 1j is manufactured as a unique piece by a co-extrusion process to form a triple-layer plate structure having an upper light-distributing layer 13j, a middle light-guiding layer 12j and a lower reflective layer 11j. The upper light-distributing layer 13j may have no diffusing particles, but has a top surface (the light-exiting surface 132j) formed as a coarse surface with controllable roughness. The middle light-guiding layer 12j can have no diffusing particles. The lower reflective layer 11j can include reflective particles 111j. The upper and the lower surfaces of the reflective layer 11j are both smooth surfaces.

Figure 16:
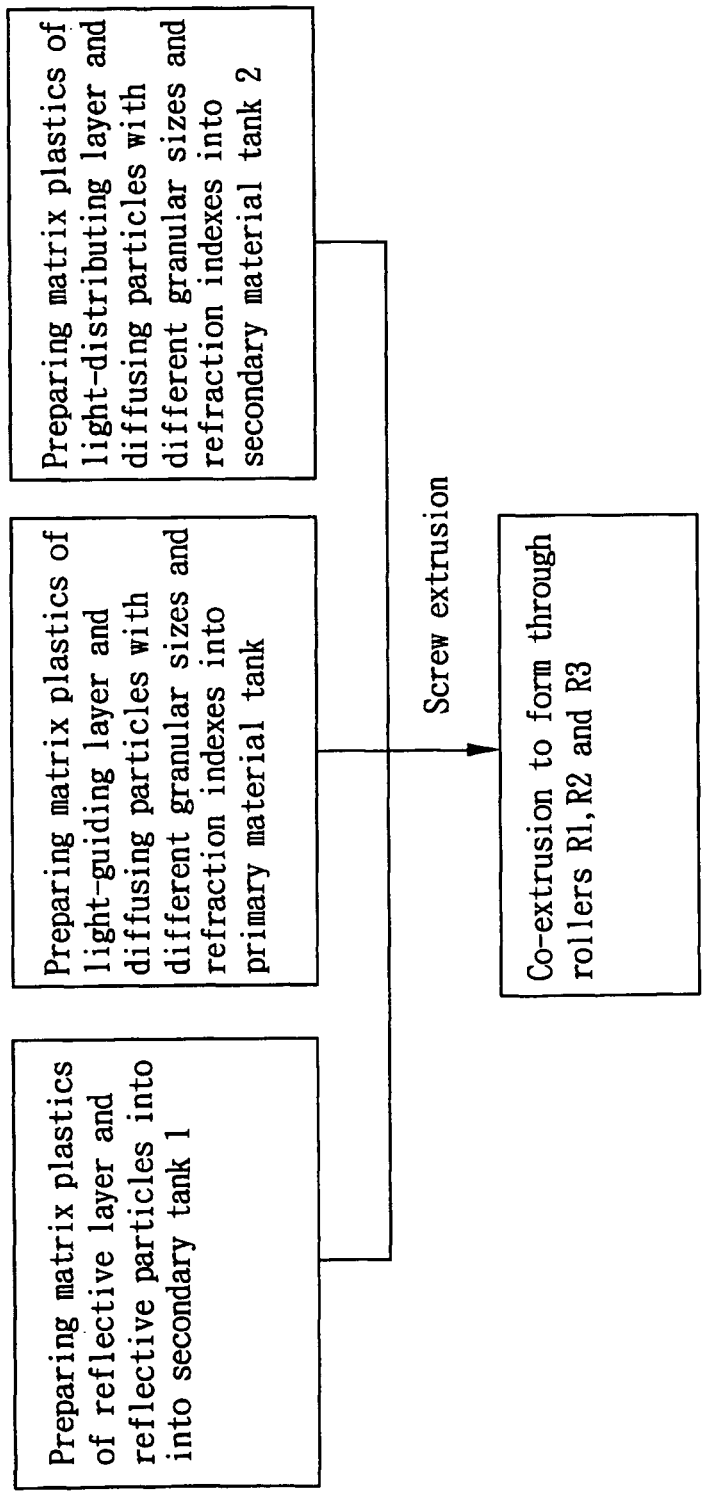
FIG. 16 is a flowchart of a co-extrusion process to manufacture the uniform reflective light-guide apparatus in accordance with the present invention.
Figure 17:
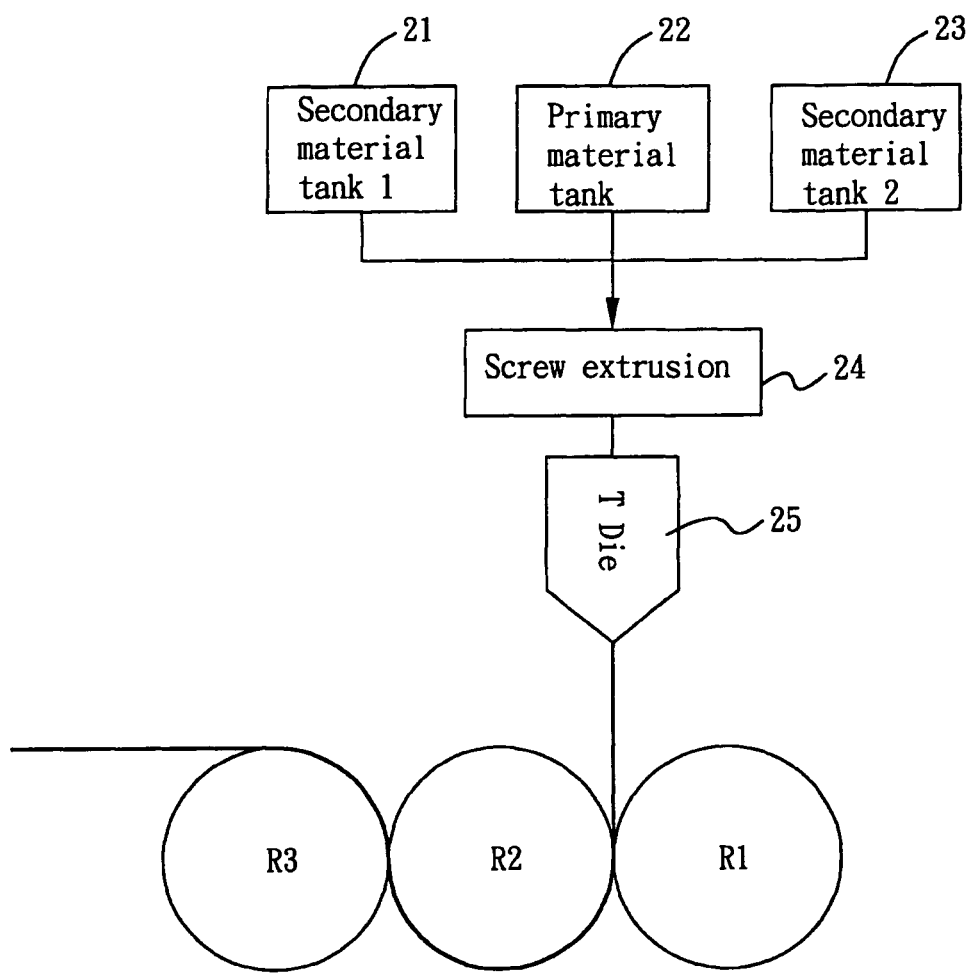
FIG. 17 shows a block diagram for the co-extrusion process of FIG. 16.

Referring now to FIGS. 16 and 17, an embodiment of a co-extrusion process for manufacturing the uniform reflective light-guide apparatus in accordance with the present invention is shown in a flowchart and a schematic block diagram, respectively. The triple-layer laminating structure shown in FIG. 9 is typically used to explain how this co-extrusion process can produce the light-guide apparatus 1d as a unique piece. First of all, prepare the matrix plastics for forming the reflective layer 11d and a appropriate amount of reflective particles 111d in a material tank 21 of a secondary extrusion machine 1. On the other hand, prepare the matrix plastics for forming the light-guiding layer 12d and a proper amount of diffusing particles 122d with various granular sizes and various refraction indexes in a material tank 22 of a primary extrusion machine. At the same time, prepare the matrix plastics for forming the light-distributing layer 13d and a proper amount of diffusing particles 131d with various granular sizes and various refraction indexes in a material tank 23 of another secondary extrusion machine 2. The matrix plastics for the light-guiding layer 12d and that for the light-distributing layer 13d can be the same. Also, Materials for the diffusing particles 122d and 131d can be the same as well. Then, materials in the material tanks 21,22 and 23 are further being screw extrusion mixed (24), respectively, before being sent to be extruded into respective layers of the T die 25. The materials mixed with corresponding particles or beads are simultaneously extruded out of the T Die 25 as a laminating form and are further rolled to form consequently by the rollers R1, R2 and R3. Then, the "all-in-one" main plate body of the light-guide apparatus 1d are formed. By compared to the conventional coating process which coats a reflective layer onto the light-guiding layer, the "all-in-one" co-extrusion process provided by the present invention can be more easily as an advanced manufacturing process.

Referring now to FIG. 18, a block diagram for a process to form a coarse surface on the light-exiting surface in accordance with the present invention is shown. In the present invention, the coarse surface can be located to the light-exiting surface of a light-distributing layer (for the triple-layer laminating structure) or a light-guiding layer capable of light-distributing (for a double-layer laminating structure). The surface roughness can be controlled by adjusting the sandblasting apparatus 31 by regulating the sandblasting pressure p, sandblasting velocity v, and the distant d between the sandblasting nozzle 32 and the roller surface 33. The surface roughness of the coarse surface will affect the electrostatic adhesion between the light-exiting surface of the light-guide apparatus of the present invention and the optical members, and the light uniformity of the light-guide apparatus. Table 2 lists a typical example.

TABLE 2

Adhesion relation between surface roughness of coarse surfaces (light-exiting surfaces) and optical members

| | Example A | Example B | Example C | Example D | Example E |
|---|---|---|---|---|---|
| d (mm) | 220 | 220 | 220 | 220 | 220 |
| p (MPa) | 0.38 | 0.38 | 0.38 | 0.38 | 0.38 |
| v (m/min) | 15 | 12 | 8 | 4 | 1 |
| Surface roughness Ra (μm) | 0.07 | 0.46 | 1.35 | 2.21 | 2.52 |

TABLE 2-continued

Adhesion relation between surface roughness of coarse surfaces (light-exiting surfaces) and optical members

| | Example A | Example B | Example C | Example D | Example E |
|---|---|---|---|---|---|
| Adhesion of optical members | Easy | Fair | Difficult | Difficult | Difficult |

In Table 2, when the surface roughness (Ra) of the light-exiting surface of the apparatus of the present invention is less than 0.46 μm, the adhesion between the light-exiting surface and the optical member will become easier and thus scratches in between become highly possible. When Ra is greater than 2.21 μm, the light output at the light-exiting surface will increase but only to decrease the light uniformity of the apparatus. Further, when Ra is greater than 6 μm, the lighting quality of the apparatus might be hard to pass the manufacturer's QC. Therefore, in the present invention, the surface roughness of the coarse surface formed on the light-exiting surface of the light-guide apparatus in accordance with the present invention is limited to a range between 0.46 μm and 2.21 μm, preferably the range between 1 μm and 2.21 μm.

In the present invention, the plastics, the matrix plastics, or say the base matrix for the light-distributing layer, the light-guiding layer and the reflective layer can be selected from, but not limited to, appropriate plastics available in the market, such as polymethylmethacrylate (PMMA), polycarbonate (PC), polyethylene terephthalate (PET), MS and so on. The diffusing particles for the light-distributing layer and the light-guiding layer can be also selected from, but not limited to, appropriate plastics particles available in the market, such as PMMA particles, PC particles, PET particles, MS particles and so on. Similarly, the reflective particles can be selected from, but not limited to, appropriate materials available in the market, such as SiO2 particles, TiO2 particles, PMMA particles and so on.

Regards the co-extrusion process for producing the light-guide apparatus of the present invention, various advantages can be obtained, such as the unique-piece plate body, high light utilization efficiency, low light loss, no need of additional reflective plate, simple structuring, less expanding on the backlight module, less adhesion to the optical members, and plenty optical merits in light uniformity, luminance and user comfort.

Figure 19:
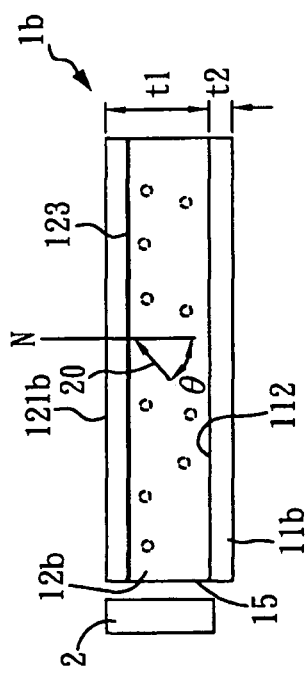
FIG. 19 shows an angle-to-photo intensity plot for the light-guide apparatus in accordance with the present invention.
Figure 19:
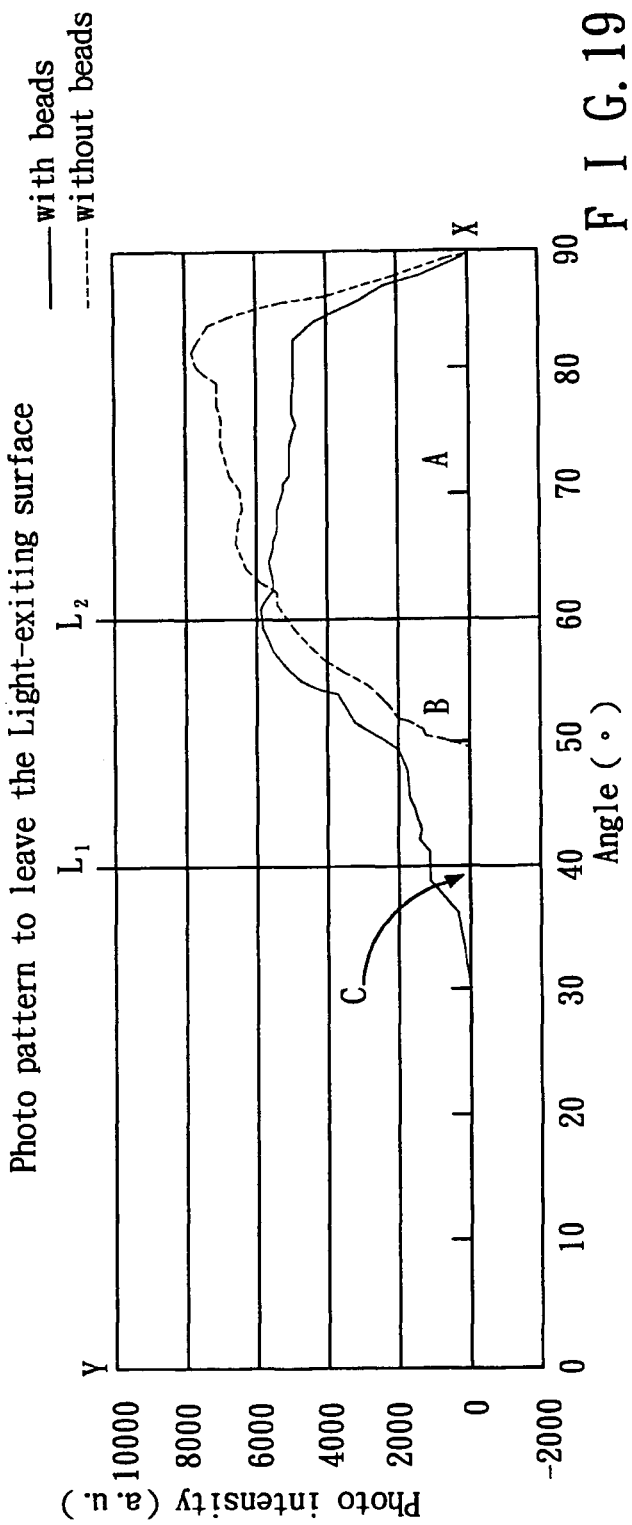

Referring now to FIG. 19, an angle-to-photo intensity plot for the light-guide apparatus in accordance with the present invention is shown. The X axis of the plot is the angle axis ranged from 0 to 90 degrees, and the Y axis of the plot is the axis for photo intensity. Have the apparatus 1b of FIG. 7 as an example. The co-extrusion double-layer plate body for the light-guide apparatus 1b of the present invention includes the upper light-guiding layer 12b capable of light distributing and added by diffusing particles with a thickness t1, and the lower reflective layer 11b added by reflective particles, with a thickness t2. The light-introducing surface 15 is located laterally to the light-guiding layer 12b of the apparatus 1b. The edge light source 2 for emitting light rays 20 is located close to the light-introducing surface 15. The light rays 20 are introduced to the light-guiding layer 12b of the apparatus 1b through the light-introducing surface 15. The interface between the light-guiding layer 12b and the reflective layer 11b is played as a reflective surface 112. The light-exiting surface 121b is located at the top surface of the light-guiding layer 12b, by opposing to the reflective surface 112 with respect to the light-guiding layer 12b. The light-introducing surface 15 is perpendicular to the light-exiting surface 121b. At an arbitrary point of the light-exiting surface 121b, a normal line N can be defined to be perpendicular to the light-exiting surface. The angle at this arbitrary point between the normal line N and the incident ray is defined as the angle θ. When a light ray 20 hits the reflective surface 112 from the light-guiding layer 12b, if the incident angle is not zero, i.e. the light ray 20 not perpendicular to the reflective surface 112, the light ray 20 will be sent back to the light-guiding layer 12b by the reflective surface 112. On the other hand, when a light ray 20 hits the light-exiting surface 121b from the light-guiding layer 12b, the light ray 20 might be reflected back or allowed to leave, either which is dependent on the angle θ between the incident light ray and the normal line N.

As shown in FIG. 19, a detector 123 can be located to the light-guiding layer 12b by being close to the light-exiting surface 121b. The detector 123 is to detect the photo pattern of light rays leaving the light-exiting surface 121b, and the photo pattern results can be plotted into the plot of FIG. 19, in terms of photo intensity to the angle θ. In the figure, L1, L2, area A, area B and area C are defined as follows.

Perpendicular line L1: the line defining the critical angle θc of the material for the light-guiding layer 12b, in which $\theta c = \sin^{-1}(1/n)$. In this embodiment, the refraction index n for the light-guiding layer 12b is 1.58. Then, θc=39.26° (about 40°). Therefore, in FIG. 19, the angle for rising L1 is almost at the angle 40°.

Perpendicular line L2: the line defining an angle by adding 20 degrees to the critical angle θc. Therefore, in FIG. 19, the angle for rising L2 is almost at the angle 60°.

Area A (light-guiding area): indicating the light ray having a larger θ. In FIG. 19, the area A is the area defined or enclosed by the light curve in the plot, the L2 and the X axis.

Area B (indirect light-exiting area): indicating the light rays having angles between θc and θc+20°. These light rays are reflected by the light-exiting surface and may come back to leave the light-guiding layer 12 by the help of the diffusing particles (or say, beads) in the light-guiding layer 12b. In FIG. 19, area B is defined by the light curve, the L1, the L2 and the X axis.

Area C (direct light-exiting area): indicating the light rays having angles less than θc. These light rays will leave the light-guiding layer 12b directly through the light-exiting surface 121b. in FIG. 19, area C is defined by the light curve, the L1 and the X axis. As shown in FIG. 19, area C is zero when the light-guiding layer does not include any bead.

In the present invention, the light-guide coefficient (LGC) is defined by LGC=A/(B+C).

The larger the LGC is, the better light-guiding performance the light-guiding layer has. When a small LGC is met, it implies that the light-guiding layer will retain most of the lights there inside. High value in the light-guiding performance implies worse luminance in the apparatus. On the other hand, if the LGC is small, high luminance will be found at a side of the light-exiting surface, in which the side is close to the light-introducing surface.

In the present embodiment for the double-layer laminating structure, t1 indicates the thickness of the light-guiding layer 12b capable of light distributing. However, for the triple-layer laminating structure having an independent light-distributing layer, t1 is the thickness sum of the light-distributing layer and the light-guiding layer, while t2 herein is the thickness of the reflective layer.

According to various embodiments from FIG. 4 to FIG. 15 of the present invention, the co-extrusion process do contribute a lot to the structuring and related performance by eliminating the air spacing between layers. Further, if the following two criteria are satisfied, optical performance in luminance and uniformity can be better ensured.

(1) $0.001 < (t2/t1) < 0.111$; and
(2) $2.07 < LGC < 4.23$.

If $(t2/t1)$ is less than 0.001, the reflection rate would be decreased for the thickness in the reflective layer is too small, such that a greater light loss would be met. If $(t2/t1) > 0.111$, the thin light-guiding layer will make worse the light distribution in the apparatus. When $LGC < 2.07$, the light-retaining rate of the light-guiding layer would be too good to damage the uniformity and thus the user comfort. When $LGC > 4.23$, the light-retaining rate of the light-guiding layer would be too small to reduce the luminance.

In order to have the LGC be controlled within 2.07~4.23, following parameters may be helpful.

From FIG. 19, it is noted that when the light-guiding layer is free of beads, the light-retaining ability will be reduced, but the ability in light-guiding will be improved; such that the exiting lights would be limited in a localized manner. Therefore, if the light-guiding layer is added by a proper amount and a proper granular size formulation of beads, an optimal optical performance in light guiding and retaining can be obtained. To better understand how the concentration and the granular size of the beads can affect the LGC value of the apparatus of the present invention, various granular sizes, concentrations and refraction indexes are introduced to simulate the aforesaid criteria for the embodiment setup shown in FIG. 19. The results are listed in the following Table 3, Table 4 and Table 5.

TABLE 3

Relationship between beads concentration and LGC at the granular size of beads being 2 μm

| Δn | 0.02 | 0.04 | 0.06 | 0.08 | 0.10 | 0.12 |
|---|---|---|---|---|---|---|
| Beads concentration 0.0001 wt % | | | | | | |
| A | 208498.01 | 207879.91 | 208735.26 | 209104.37 | 208264.72 | 208867.13 |
| B + C | 51324.80 | 51636.67 | 51026.89 | 50997.63 | 50771.04 | 51353.73 |
| LGC | 4.06 | 4.03 | 4.09 | 4.10 | 4.10 | 4.07 |
| Beads concentration 0.002 wt % | | | | | | |
| A | 208437.12 | 210590.23 | 210011.17 | 209334.61 | 210016.40 | 209428.39 |
| B + C | 51766.93 | 50834.07 | 51113.76 | 52110.23 | 51520.57 | 51416.40 |
| LGC | 4.03 | 4.14 | 4.11 | 4.02 | 4.08 | 4.07 |
| Beads concentration 0.05 wt % | | | | | | |
| A | 211325.54 | 210338.55 | 206829.33 | 202062.28 | 195007.11 | 186715.50 |
| B + C | 51561.46 | 52193.76 | 53707.08 | 55446.51 | 58937.18 | 62006.60 |
| LGC | 4.10 | 4.03 | 3.85 | 3.64 | 3.31 | 3.01 |
| Beads concentration 0.2 wt % | | | | | | |
| A | 211310.68 | 200821.40 | 187478.11 | 169020.76 | 155730.88 | 148640.25 |
| B + C | 52697.47 | 56800.31 | 61649.31 | 68791.45 | 68945.72 | 69431.03 |
| LGC | 4.01 | 3.54 | 3.04 | 2.46 | 2.26 | 2.14 |

TABLE 4

Relationship between beads concentration and LGC at the granular size of beads being 6 μm

| Δn | 0.02 | 0.04 | 0.06 | 0.08 | 0.10 | 0.12 |
|---|---|---|---|---|---|---|
| Beads concentration 0.0001 wt % | | | | | | |
| A | 208371.06 | 208061.37 | 207466.43 | 208391.74 | 208565.21 | 208288.71 |
| B + C | 51349.88 | 50656.52 | 50817.76 | 51484.79 | 51175.75 | 51711.57 |
| LGC | 4.06 | 4.11 | 4.08 | 4.05 | 4.08 | 4.03 |
| Beads concentration 0.002 wt % | | | | | | |
| A | 209419.68 | 209793.86 | 210171.42 | 209341.85 | 211353.26 | 210570.89 |
| B + C | 52123.54 | 51249.90 | 51044.58 | 51003.34 | 51273.76 | 51728.06 |
| LGC | 4.02 | 4.09 | 4.12 | 4.10 | 4.12 | 4.07 |
| Beads concentration 0.05 wt % | | | | | | |
| A | 211223.55 | 209344.29 | 208811.13 | 204968.58 | 206007.14 | 202145.27 |
| B + C | 50973.60 | 51093.70 | 52745.58 | 52590.55 | 54850.59 | 54963.03 |
| LGC | 4.14 | 4.10 | 3.96 | 3.90 | 3.76 | 3.68 |
| Beads concentration 0.2 wt % | | | | | | |
| A | 210548.02 | 210604.38 | 202317.62 | 196428.65 | 183832.05 | 175748.16 |
| B + C | 51287.74 | 53305.66 | 54756.06 | 59955.21 | 62759.34 | 63918.79 |
| LGC | 4.11 | 3.95 | 3.69 | 3.28 | 2.93 | 2.75 |

TABLE 5

Relationship between beads concentration and
LGC at the granular size of beads being 10 μm

| Δn | 0.02 | 0.04 | 0.06 | 0.08 | 0.10 | 0.12 |
|---|---|---|---|---|---|---|
| Beads concentration 0.0001 wt % | | | | | | |
| A | 207699.87 | 207319.62 | 207805.80 | 209704.41 | 207954.00 | 208759.94 |
| B + C | 51876.95 | 51435.20 | 51022.44 | 51367.43 | 51088.77 | 50994.87 |
| LGC | 4.00 | 4.03 | 4.07 | 4.08 | 4.07 | 4.09 |
| Beads concentration 0.002 wt % | | | | | | |
| A | 208744.84 | 209090.01 | 210317.62 | 209756.59 | 208942.29 | 209406.64 |
| B + C | 51387.45 | 52279.72 | 51767.20 | 51445.50 | 51220.61 | 51898.92 |
| LGC | 4.06 | 4.00 | 4.06 | 4.08 | 4.08 | 4.03 |
| Beads concentration 0.05 wt % | | | | | | |
| A | 211517.72 | 209612.25 | 211047.21 | 209318.93 | 207945.61 | 204441.15 |
| B + C | 50787.01 | 50599.69 | 51987.83 | 53262.51 | 53207.72 | 55027.92 |
| LGC | 4.16 | 4.14 | 4.06 | 3.93 | 3.91 | 3.72 |
| Beads concentration 0.2 wt % | | | | | | |
| A | 209959.50 | 210219.32 | 206134.73 | 200487.73 | 191672.69 | 187296.05 |
| B + C | 51185.03 | 52108.09 | 55025.42 | 55691.66 | 58555.79 | 62352.86 |
| LGC | 4.10 | 4.03 | 3.75 | 3.60 | 3.27 | 3.00 |

From the foregoing Table 3 to Table 5, when the beads concentration is less than 0.002 wt %, the refraction index has less influence on LGC. Therefore, the factor of the refraction index of the beads can be neglected in designing the coarse surface. When the beads concentration is greater than 0.05 wt %, the factor of the refraction index of the beads becomes important to the LGC. Therefore, the LGC, the light uniformity and the user comfort can be adjusted by altering the refraction index of the beads. Also, the granular size and the concentration can be used as well to adjust the LGC to locate within 2.07~4.23.

Referring now to FIG. 20, an embodiment of an LED display having the uniform reflective light-guide apparatus in accordance with the present invention is schematically shown. The LCD display includes a backlight module and an LCD panel 57 located above the backlight module. The backlight module further includes an edge light source 2, at least an optical membrane 590 and the uniform reflective light-guide apparatus 1$d$ of the present invention shown in FIG. 9. The apparatus 1$d$ is a one-piece triple-layer laminating plate structure and includes a light-distributing layer 13$d$, a light-guiding layer 12$d$ and a reflective layer 11$d$. The light-introducing surface 15$d$ for introducing lights of the edge light source 2 into the light-guiding layer 12$d$ is defined laterally to the light-guiding layer 12$d$. The reflective layer 11$d$ can reflect the incident light rays from the light-guiding layer 12$d$ back to the light-guiding layer 12$d$. The light-exiting surface 132$d$ for allowing portion of lights to leave the light-guiding layer 12$d$ is located at the top surface of the light-distributing layer 13$d$, and is perpendicular to the light-introducing surface 15$d$. The optical membrane 590 is to cover the light-exiting surface 132$d$ so as to improve the user comfort and to enhance the light uniformity. The LCD panel 57 is located at a side of the optical membrane 590, which the side is far from the light-guiding layer 12$d$.

While the present invention has been particularly shown and described with reference to a preferred embodiment, it will be understood by those skilled in the art that various changes in form and detail may be without departing from the spirit and scope of the present invention.

We claim:

1. A uniform reflective light-guide apparatus which can be used with an edge light source, said uniform reflective light-guide apparatus comprising:
   a light-guiding layer, further having a lateral side thereof to be defined as a light-introducing surface for allowing entrance of lights from the edge light source and a plurality of diffusing particles mixed therein;
   a reflective layer for reflecting the lights back to the light-guiding layer; and
   a light-exiting surface perpendicular to the light-introducing surface for allowing at least a portion of the lights in the light-guiding layer to leave the light-guide apparatus therefrom;
   wherein the reflective layer and the light-guiding layer are manufactured integrally by a co-extrusion process so as to avoid possible existence of an air spacing between the reflective layer and the light-guiding layer;
   wherein a light-guide coefficient (LGC) for the light-guide apparatus satisfies a limitation of $2.07<LGC<4.23$;
   wherein the LGC is computed as $LGC=A/(B+C)$, the A being an area defined by a light curve in an angle-to-photo intensity plot for exiting light rays with respect to the light-guide apparatus, an L2 in the plot and an X axis of the plot, the B being an area defined by the light curve, an L1 in the plot, the L2 and the X axis, and the C being an area defined by the light curve, the L1 and the X axis; the plot having an angle θ ranged from 0 to 90 degrees to define the X axis and a corresponding intensity to define a Y axis, the angle θ being an angle at an arbitrary point of the light-exiting surface between a normal line thereof and a corresponding incident ray; the incident ray being able to be 100% reflected back to the light-guiding layer by the reflective layer if the angle θ is greater than a critical angle θc, the L1 being perpendicular to the X axis to define the critical angle θc, the L2 being perpendicular to the X axis to define an angle by adding 20 degrees to the critical angle θc.

2. The light-guide apparatus according to claim 1, wherein said light-guide apparatus further satisfies another limitation of $0.001<(t2/t1)<0.111$, the t1 being a thickness of said light-guiding layer, the t2 being a thickness of said reflective layer.

3. The light-guide apparatus according to claim 1, further comprising at least one of the following:
  a light-distributing layer, located at a lateral side of said light-guiding layer by opposing to said reflective layer;
  two plastics with different refractive indexes, mixed in said reflective layer;
  a plurality of reflective particles, mixed in said reflective layer; and
  one of a coarse surface and a matted surface with a controllable transmittance, formed on said light-exiting surface.

4. The light-guide apparatus according to claim 3,
  wherein a difference in refraction index ($\Delta n$) between said diffusing particles and said light-guiding layer is $0.04 < \Delta n < 0.1$, a size for said diffusing particles is ranged between 2 µm and 10 µm, and a refraction index for said light-guiding layer is ranged between 1.42 and 1.63, in the case that said light-guiding layer includes said diffusing particles;
  wherein said light-existing surface is located either on said light-distributing layer or on said light-guiding layer, in the case that said light-guide apparatus includes said light-distributing layer;
  wherein a mixture ratio for said two plastics is about 7:3, in the case that said reflective layer is mixed with said two plastics with different refraction indexes;
  wherein a refraction index for said reflective particles is ranged from 2.2 to 3.2, a weight proportion for said reflective particles is less than 0.5%, a size for said reflective particles is ranged from 4-50 µm, a refraction index for said plastics of said reflective layer is ranged from 1.6-2.5, and a difference in refraction index ($\Delta n$) between said reflective layer and said light-guiding layer is ranged between 0.05 and 1, in the case that said reflective layer is mixed with said reflective particles; and
  wherein a roughness (Ra) for said light-exiting surface is 1 µm<Ra<6 µm, in the case that said light-exiting surface includes said coarse surface.

5. The light-guide apparatus according to claim 3, wherein, when said light-guide apparatus comprises said light-distributing layer, said light-distributing layer further includes a plurality of diffusing particles, wherein a difference in refraction index ($\Delta n$) between the diffusing particles and said light-distributing layer is ranged between 0.04 and 0.1, a size of the diffusing particle in said light-distributing layer is ranged between 2 µm and 10 µm, and a refractive index for said light-distributing layer is ranged between 1.42 and 1.63.

6. The light-guide apparatus according to claim 3, wherein said critical angle is computed as $\theta c = \sin^{-1}(1/n)$, in which n is a refractive index for said light-guiding layer, and a roughness (Ra) of said light-exiting surface is limited to 1 µm<Ra<2.21 µm if said light-exiting surface has said coarse surface.

7. A backlight module having a uniform reflective light-guide apparatus, comprising:
  an edge light source;
  a light-guiding layer, further having a lateral side thereof to be defined as a light-introducing surface for allowing entrance of lights from the edge light source and a plurality of diffusing particles mixed therein;
  a reflective layer for reflecting incident lights back to the light-guiding layer;
  a light-exiting surface perpendicular to the light-introducing surface for allowing at least a portion of the lights in the light-guiding layer to leave the light-guide apparatus therefrom; and
  at least an optical membrane, covering the light-exiting surface;
  wherein the reflective layer and the light-guiding layer are manufactured integrally by a co-extrusion process so as to avoid possible existence of an air spacing between the reflective layer and the light-guiding layer;
  wherein a light-guide coefficient (LGC) for the light-guide apparatus satisfies a limitation of 2.07<LGC<4.23; and
  wherein the LGC is computed as LGC=A/(B+C), the A being an area defined by a light curve in an angle-to-photo intensity plot for exiting light rays with respect to said light-guide apparatus, an L2 in the plot and an X axis of the plot, the B being an area defined by the light curve, an L1 in the plot, the L2 and the X axis, and the C being an area defined by the light curve, the L1 and the X axis; the plot having an angle θ ranged from 0 to 90 degrees to define the X axis and a corresponding intensity to define a Y axis, the angle θ being an angle at an arbitrary point of said light-exiting surface between a normal line thereof and a corresponding incident ray; the incident ray being able to be 100% reflected back to said light-guiding layer by said reflective layer if the angle θ is greater than a critical angle θc, the L1 being perpendicular to the X axis to define the critical angle θc, the L2 being perpendicular to the X axis to define an angle by adding 20 degrees to the critical angle θc.

8. An LCD display having uniform reflective light-guide apparatus, comprising:
  an edge light source;
  a light-guiding layer, further having a lateral side thereof to be defined as a light-introducing surface for allowing entrance of lights from the edge light source and a plurality of diffusing particles mixed therein;
  a reflective layer for reflecting incident lights back to the light-guiding layer;
  a light-exiting surface perpendicular to the light-introducing surface for allowing at least a portion of the lights in the light-guiding layer to leave the light-guide apparatus therefrom;
  at least an optical membrane, covering the light-exiting surface; and
  an LCD panel, located at a side of the optical membrane opposing to the light-guiding layer;
  wherein the reflective layer and the light-guiding layer are manufactured integrally by a co-extrusion process so as to avoid possible existence of an air spacing between the reflective layer and the light-guiding layer;
  wherein a light-guide coefficient (LGC) for the light-guide apparatus satisfies a limitation of 2.07<LGC<4.23; and
  wherein the LGC is computed as LGC=A/(B+C), the A being an area defined by a light curve in an angle-to-photo intensity plot for exiting light rays with respect to said light-guide apparatus, an L2 in the plot and an X axis of the plot, the B being an area defined by the light curve, an L1 in the plot, the L2 and the X axis, and the C being an area defined by the light curve, the L1 and the X axis; the plot having an angle θ ranged from 0 to 90 degrees to define the X axis and a corresponding intensity to define a Y axis, the angle θ being an angle at an arbitrary point of said light-exiting surface between a normal line thereof and a corresponding incident ray; the incident ray being able to be 100% reflected back to said light-guiding layer by said reflective layer if the angle θ is greater than a critical angle θc, the L1 being perpendicular to the X axis to define the critical angle θc, the L2 being perpendicular to the X axis to define an angle by adding 20 degrees to the critical angle $\theta c$.

* * * * *